June 30, 1925.                        1,543,951

G. PIERCE

AUTOMOBILE HEADLIGHT

Filed Sept. 12, 1923

Inventor
G. Pierce
By E.J. Fetherstonhaugh
Attorney

Patented June 30, 1925.

1,543,951

UNITED STATES PATENT OFFICE.

GEORGE PIERCE, OF MONTREAL, QUEBEC, CANADA.

AUTOMOBILE HEADLIGHT.

Application filed September 12, 1923. Serial No. 662,354.

*To all whom it may concern:*

Be it known that I, GEORGE PIERCE, a citizen of the United States of America, and residing at the city of Montreal, in the Province of Quebec, in the Dominion of Canada, have invented a new and useful Improvement in Automobile Headlights, of which the following is the specification.

The invention relates to automobile headlight mounting, as described in the present specification and shown in the accompanying drawing that form part of the same.

The invention consists essentially of the novel features pointed out broadly and specifically in the claim for novelty following a description containing an explanation in detail of an acceptable form of the invention.

The objects of the invention are to eliminate the glare of headlights in motor vehicles and thereby avoid distressing accidents to approaching cars; to accomplish this purpose by means of a simple mechanism of well known design at a comparatively cheap price in respect to motor accessories; and generally to provide an efficient device whereby the rays of the headlight are made use of for an important purpose and the confusion due to their bright reflection of the light entirely lost.

In the drawings Figure 1 is a front elevation of a motor car showing the lights in their normal position.

Like numerals of reference indicate corresponding parts in the various figures.

Figure 1:
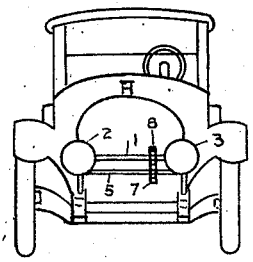
Figure 2:
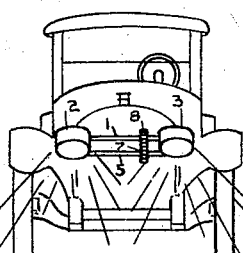
Figure 2 is a front elevation of a motor car showing the lights dipped to remove the glare.
Figure 4:
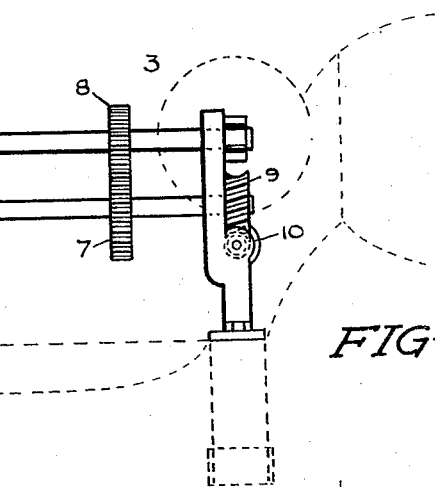
Figure 4 is an assembled view of the operating mechanism in front elevation.
Figure 3:
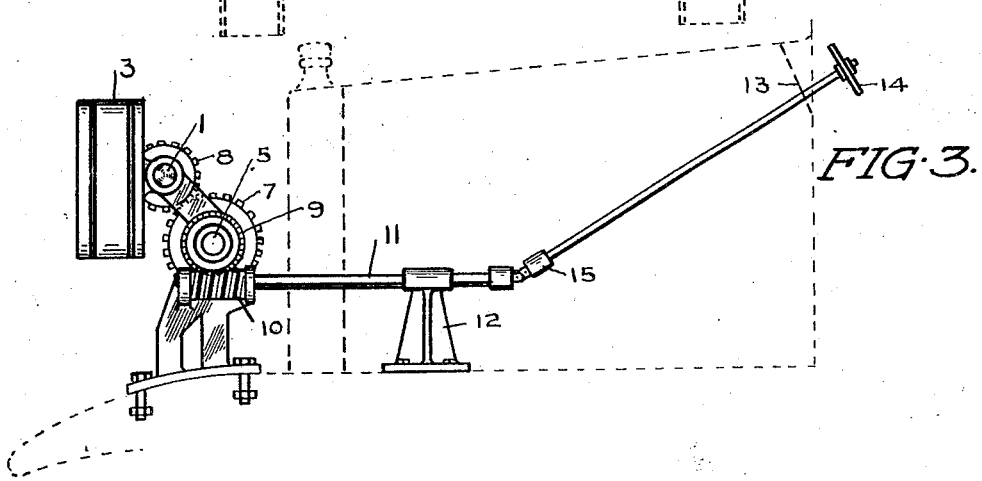
Figure 3 is an assembled view of the operating mechanism in side elevation.

Referring to the drawings the transverse shaft 1 carries the headlights 2 and 3 securely fastened thereto and is journalled in the bearings 4, which are supported from the body of the car at the front end.

A second transverse shaft 5 is journalled in the bearings 6 also from the body of the car and at a convenient operating distance from the shaft 1 and connected thereto by the gear 7 and pinion 8 respectively mounted on the said shafts 5 and 1.

The worm wheel 9 is mounted on the shaft 5 and is driven by the worm 10 at the end of the longitudinal shaft 11 which is journalled in the bearings 12 also supported from the body of the car and extending to the dash 13 and having the operating wheel 14 mounted thereon said shaft 11 preferably being in sections flexibly connected by the universal joint 15.

In the operation of this invention the hand wheel 14 is turned, which revolves the shaft 11 and turns the headlight shaft to the desired extent to dip the lights and turn their rays on to the front wheels where the light is of good service, while its glare is removed from ahead, and therefore kept from confusing an approaching car or other vehicle.

The light on the wheels is very important for the purpose of passing the other car in a dark night and also materially aids the motorist in discerning the nature of the road immediately at his wheels until he is in a position to return the lights to normal position for showing him the road in advance as customary.

The hand wheel lever or other operating device may have suitable stops or snaps for limiting its movement and further the lights may be dipped in many different ways and by various means and it is only for the better understanding of the invention that the details of this mechanism have been so precisely shown and described.

What I claim is:—

In automobile headlights spaced brackets secured to the frame of the machine and having inclined upper portions and provided at the ends of the same with upper and lower bearings, upper and lower transverse shafts mounted in the said bearings and located in advance of the engine hood, lamps mounted upon the upper transverse shaft, intermeshing gears fixed to the shafts, a worm wheel located at one end of the lower transverse shaft and connected therewith, adjacent one of the said brackets, and operating shaft composed of a horizontal front portion and an inclined rear portion and provided with a connecting universal joint the horizontal front portion of the operating shaft being mounted below the worm wheel in the adjacent bracket, a worm mounted upon the said horizontal portion of the operating shaft and meshing with the worm wheel and adapted to be rotated by the operating shaft to partially rotate the said transverse shafts and tilt the lamps from an upright position and return them to said position.

Signed at Montreal this 28th day of August, 1923.

GEORGE PIERCE.